United States Patent [19]

Briggs

[11] Patent Number: 4,912,628
[45] Date of Patent: Mar. 27, 1990

[54] SUSPENDING AND RESUMING PROCESSING OF TASKS RUNNING IN A VIRTUAL MACHINE DATA PROCESSING SYSTEM

[75] Inventor: Alton A. Briggs, Scottsdale, Ariz.

[73] Assignee: International Business Machines Corp., Armonk, N.Y.

[21] Appl. No.: 168,300

[22] Filed: Mar. 15, 1988

[51] Int. Cl.$^4$ .............................................. G06F 9/44
[52] U.S. Cl. ................................ 364/200; 364/228.2; 364/230.2; 364/261.2; 364/264.2; 364/300
[58] Field of Search ........................ 364/200, 900, 300

[56] References Cited

U.S. PATENT DOCUMENTS

| | | | |
|---|---|---|---|
| 4,400,769 | 8/1983 | Kaneda et al. | 364/200 |
| 4,631,674 | 12/1986 | Blandy | 364/300 |
| 4,642,756 | 2/1987 | Sherrod | 364/200 |
| 4,674,038 | 6/1987 | Brelsford et al. | 364/200 |
| 4,695,945 | 9/1987 | Irwin | 364/200 |
| 4,860,190 | 8/1989 | Kaneda et al. | 364/200 |

*Primary Examiner*—Thomas C. Lee
*Attorney, Agent, or Firm*—Edward H. Duffield

[57] ABSTRACT

A method for suspending and later resuming operation or processing of a program running in a virtual machine is described. The method involves creating and running a special program in the virtual machine which is to be accorded suspend and resume control functions. The suspend/resume control function program is run first before a user's task is run. The special suspend/resume program seizes control over the virtual machine's external interrupt controls and modifies them to direct all incoming interrupts to the program itself rather than allowing CMS of the virtual machine to handle interrupts as is normally done. With incoming interrupts being sent to the suspend/resume program for analysis and response, incoming commands that generate such interrupts may be responded to and sub-routines contained within the suspend/resume task program may be employed to save all of these addressing registers and general register contents. The suspend/resume task program operates to modify the interrupt controls of the virtual machine to create a suspension of operation of the user's task program by enabling the virtual machine only for external interrupts. The machine is later restored to operation and the user's task is resumed from its interrupted point by restoring all register contents, resetting the program status words and resetting the interrupt controls to enable full restoration of all operations.

7 Claims, 4 Drawing Sheets

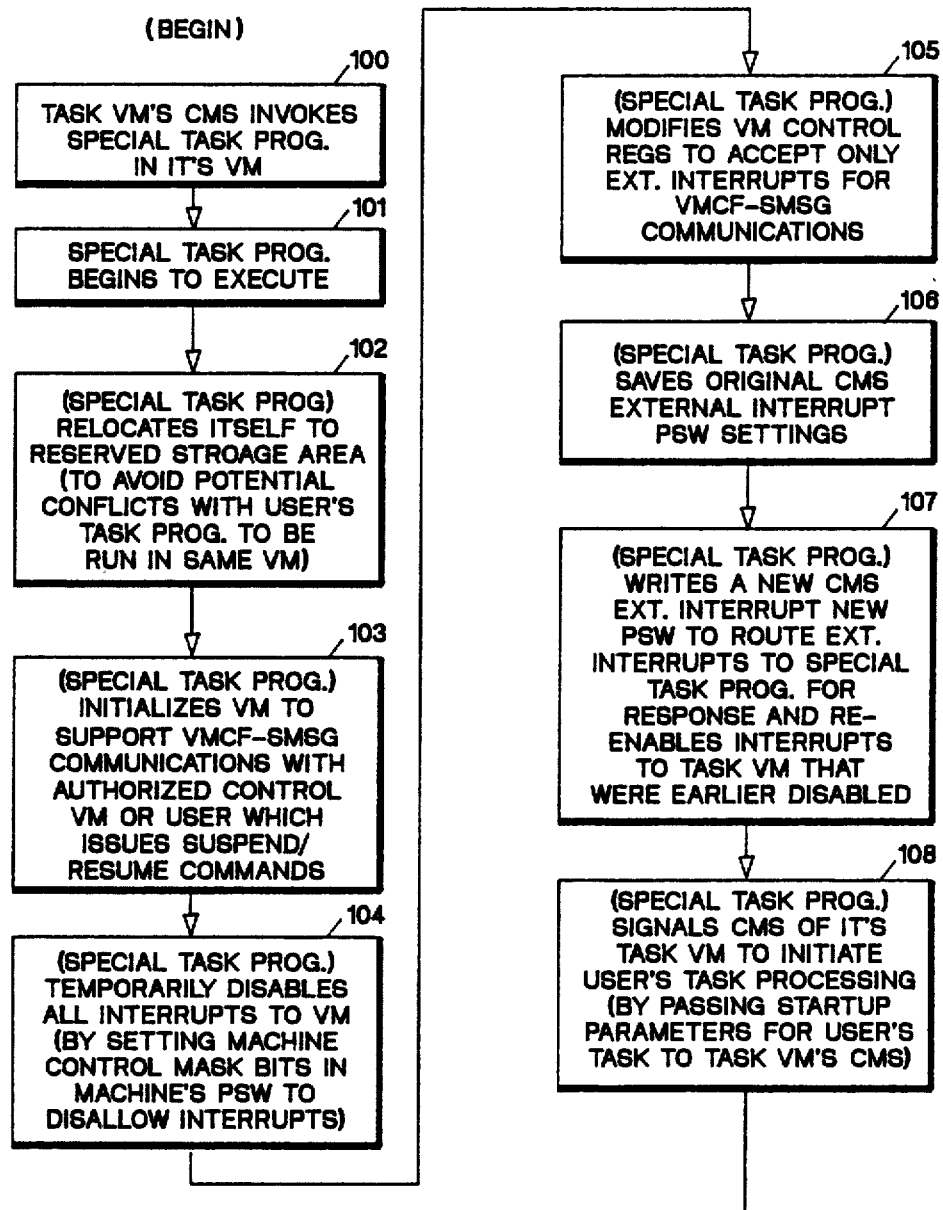

SUSPENDING AND RESUMING PROCESSING OF TASKS RUNNING IN A VIRTUAL MACHINE DATA PROCESSING SYSTEM

BACKGROUND OF THE INVENTION

1. Field of the Invention

This invention relates to data processing computer system controls and architecture generally and specifically to the so-called "virtual machine" operational systems known as the IBM System 370 and 370/XA and other similar systems.

2. Prior Art

In virtual machine operating systems such as the IBM System 370 or the like, it has long been desirable but not practically feasible to perform temporary suspension of a job running in a particular virtual machine without risking interference with other programs running in other virtual machines in the same system. There are numerous reasons why users of such systems may wish to suspend and ordinarily resume at some later point the work being done as a task in one or more portions of the computer system's workload. A common reason that suspension of a given task or tasks may be requested is to reduce contention for the computer system's resources and to allow temporary allocation of the resources for other work. For example, interactive system users often experience a slower response time when the computer system is occupied with long-term tasks such as batch tasks for which the actual completion time of the task is less critical than those for which the interactive user is contending. In a typical example running the "payroll program" may require several hours of computer system time during which other would-be interactive users experience slow-down or actual inability to access computer resources for their tasks.

Other reasons for halting tasks running in a virtual machine include those of halting the job until some needed resource is available or to suspend the task that is processing until some procedural or processing issue has been resolved.

As noted above, there has not been a practically feasible procedure for performing a suspend and resume operation in a virtual machine running tasks or jobs for users that was not unduly risky or which did not require extreme skill on the part of the operator. Techniques of stopping and restarting processing of a task at acceptable points and in a safe manner not endangering the task or other work on the computer system, may be accomplished, in theory at least, by a skilled system operator. However, it is an extremely delicate and risky procedure that can easily jeopardize all of the work being done in the system. Additionally, these techniques are usually limited to the specific operating system and its current release level of function and may not be conducted in the same system with a given release level different from that for which the techniques have been developed.

Still other approaches require modification of the operating system itself. This is an undesirable situation which most users wish to avoid because of the added risks and maintenance costs associated with creating any error in the operating system which was not produced by the system's original source vendor.

Prior possible techniques for causing a suspend and resume operation in the batch or in a virtual machine processing environment have simply contained unacceptable risk and inconvenience and/or cost and are not suitable for usage by the characteristic users of such a system or of the system operators themselves.

In light of these difficulties with the known prior systems, it is an object of this invention to provide a means of suspending and resuming operation of processing a task in a virtual machine data processing system utilizing only standard available programming and control techniques and without jeopardizing any other programs or processes operating in the data processing system at that time.

BRIEF SUMMARY

The foregoing and still other objects of the invention not specifically enumerated are accomplished in a preferred embodiment of the invention that will be described further herein. Briefly, the process of safely facilitating suspension and later resumption of a task being processed in a virtual machine involves execution of a small special task program in the virtual machine in which a given task or job is to be run just prior to running the job itself.

The special small program implements the techniques for facilitating suspension and resumption of the actual task that will be run in that virtual machine. When the special program for suspend and resume operation is loaded, it first moves itself to an area of otherwise free or reserved storage so that its operation will not be overwritten or interfered with when the task program runs. The program enables communication with the controlling user's virtual machine in the data processing system utilizing existing program-to-program communication facilities such as the IUCV or VMCF facility in the IBM System 370.

The suspend and resume program then seizes control of the external interrupt new program status word (PSW) for the virtual machine that it runs in so that it, rather than the normal conversational monitor system (CMS), has control over the external interrupts for the virtual machine. This seizing of control over the program handling interrupt controls for the task virtual machine is a critical part of the process for facilitating suspension and resumption of the tasks. The suspension and resumption program rewrites the virtual machine PSW to direct all incoming external interrupts into the program itself rather than to allow the CMS system to handle them. Then, when a user sends a suspend or resume command to the system control program, the system control program forwards the command and an interrupt signalling the presence of the command to the task virtual machine which directs the incoming interrupt directly to the suspend and resume program rather than handling the interrupt itself.

The suspension and resumption program running in the task machine will receive the external interrupt caused by the incoming command from the user. For a suspension, this program will revise the external interrupt controls of the virtual machine via rewriting its program status word to enable the PSW only for external interrupts instead of permitting, in addition to external interrupts, all of the normal functions of instruction execution, i.e., fetching, decoding, etc. This effectively halts processing of the user's job operating in the task virtual machine. At the same time, the suspend and resume program saves the base addressing register contents and all associated general register contents so as to preserve a "snapshot" of the existing state of the operations being conducted in the program running in the task machine at the time the interrupt was received.

The machine remains in the suspended state until an incoming external interrupt occurs and since this is the only task that it is permitted to handle, the incoming interrupt is directed to the suspend and resume task program where it is analyzed and, if it is a resume command that is received, operation will be restored via rewriting the program status word for the virtual machine and restoring the register contents to their state at the time the interrupt for suspension was received. The transfer of control over handling of program interrupts from the virtual machine and its supervisory program to a task program running in the virtual machine is the key step in the method described.

The invention will now be described in greater detail with reference to a preferred embodiment thereof which is further illustrated with respect to the drawings of a preferred embodiment in which:

BRIEF DESCRIPTION OF THE DRAWINGS

FIGS. 2A-2C, illustrates a flow chart of the operation of the suspend and resume program and its technique of controlling a virtual machine to permit suspension and resumption of processing therein.

DESCRIPTION OF PREFERRED EMBODIMENT

Figure 1:
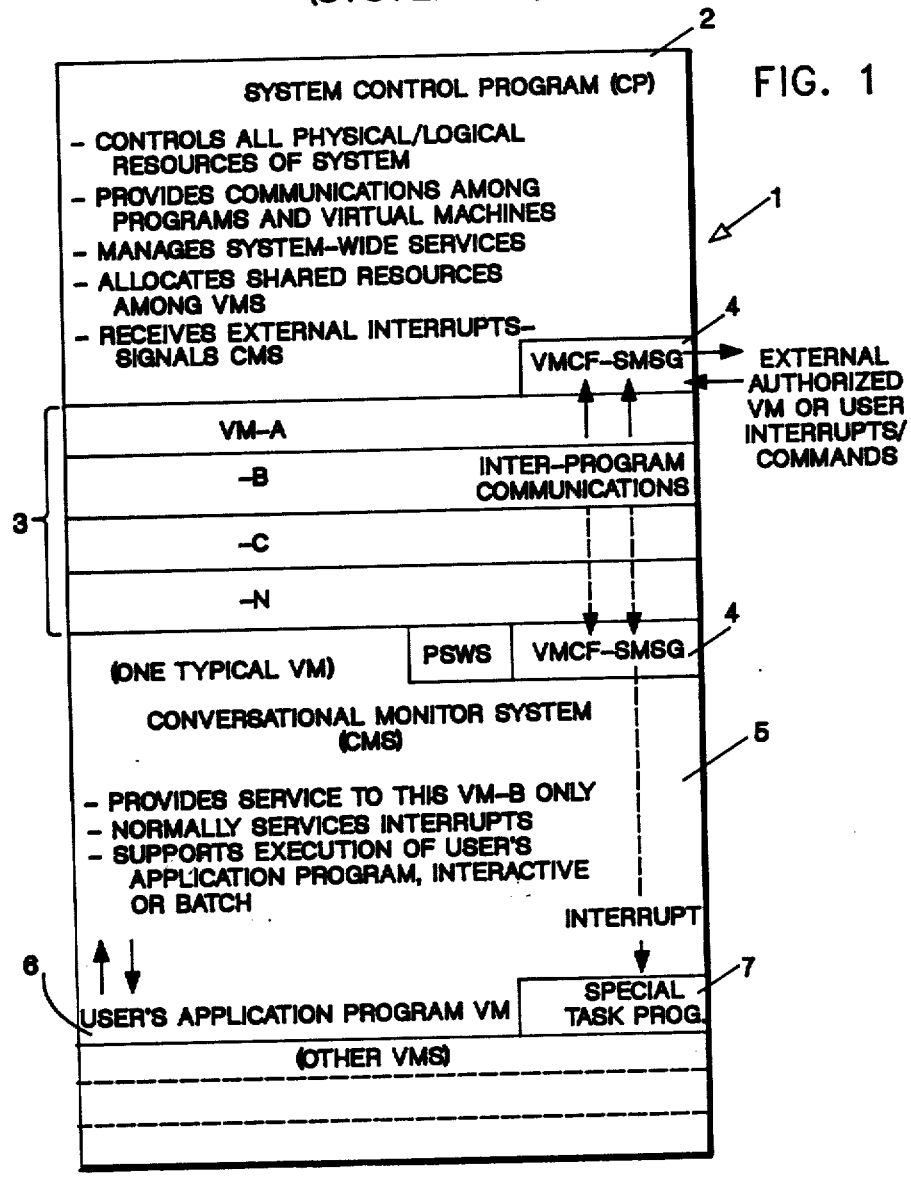
FIG. 1 illustrates schematically the conceptual hierarchy of a typical System 370 data processing environment and illustrating that the computer system contains a system control program, and one or more virtual machine entities.

A description of a preferred embodiment of the invention will now be given with reference to the drawings briefly alluded to earlier. At the outset, various terms and abbreviations will be reviewed for those who may be unfamiliar with the virtual machine data processing systems currently available in the marketplace such as the IBM System 370. In general, these systems are described in the "System 370 Principles of Architecture" IBM manual no. GA22-7000 and in the "VM System Programmer's Guide", IBM manual no. SC19-6224 and in the "Conversational Monitor System Manual" IBM no. SC19-6209 which discuss various aspects of such data processing systems, their method of operation and the details of the various facilities which are employed in carrying out the present invention. A list of abbreviations commonly encountered in these manuals and used in this description are as follows:

CP—This is the control program component of the virtual machine system. It is the primary interface and control point for users requesting services of the System 370 and for coordinating the operations of the various virtual machines running in the system. The control program CP both manages and provides service to the virtual machines running within its domain.

CMS—This is the conversational monitor system and is the user's operating system environment for a virtual machine. It performs many services that are required by user applications.

External Interrupt—This is a type of program interrupt that occurs and requires analysis and response, generally from the CMS. When an interrupt occurs, a portion of control code is placed by the system into the external interrupt old program status word registers accessible to the virtual machine and processing continues according to the information that is found in another portion of code normally referred to as the external interrupt new PSW.

General Registers—These are a set of registers used for general purposes by programs operating in the virtual machines for containing intermediate results, address locations in memory where data is stored and other computational results that are occurring.

Macro Instruction or simply "Macro"—A series of instructions for a small program that may be invoked by a single program statement. Some examples that are pertinent to the program being considered in this description are DMSFREE, DMSKEY, LINEDIT, WRTERM, SAVE, RETURN and others, all of which are well known and fully documented in the aforementioned system manuals.

PSW—The program status word. This a fundamental component of the IBM computer systems of the sort utilized herein. In such systems there are multiple pairs of PSWs, each pair pertaining to specific states of machine operation. Each pair consists of an old PSW indicating the machine state at the time that an interrupt occurred, and a new PSW which determines that state of the machine immediately following an interrupt, i.e., the PSW which is switched to on the occurrence of an interrupt. In VM systems, each virtual machine has its own set of PSWs. In addition to old and new PSWs, there is the active PSW which changes as instructions are executed. If an interrupt occurs, the active PSW is placed in the "old" PSW storage area and the corresponding "new" PSW is given control by the hardware. Once the interrupt has been processed, the old PSW may again be used to restore processing to the point at which the interrupt occurred. All PSWs contain special control information for controlling the architectural states of the virtual machine, including those controls that determine which interrupts are allowed.

Rx—This is a common notation for the general register x.

SMSG—This is a special message, a type of VMCF communication utilized within the System 370 to allow communications among virtual machines.

Virtual Machine—This is the basic unit of work, sometimes called a task, that is managed by the control program. For example, control over a batch operation or task resides in a virtual machine and user jobs are run in other virtual machines within the system. The special task program that facilitates suspend and resume operations that will be described herein executes in one of the virtual machines concurrent with the user job.

VM—The acronym VM is used to refer to virtual machine, the VM system control program sometimes referred to as CP or to the software environment known is virtual machine environment.

VMCF—Virtual machine communication facility. This is a control program facility for communication among virtual machines and programs.

Having thus defined some of the basic terms of reference that are utilized herein and which are familiar to users of virtual machine architectures in general, the invention will now be described in greater detail with reference to FIG. 1.

In FIG. 1, a schematic pictorial of the environment of a virtual machine data processing system is shown. Virtual machines as referred to herein, constitute virtual computers including effective access to I/O devices, memory, machine control such as interrupt controls and instruction processing cycles, to name but a few of the elements. Virtual machines include complete arithmetic and logic unit computational capability via sharing of one or more central facilities for this, and are organized and operated under control of the CP control program. In FIG. 1, the overall system 1 is shown to include a system control program CP 2 and a number of virtual machines 3 denoted VMA, VMB, etc. Each typical VM machine includes a conversational monitor system program CMS that provides services to the specific virtual machine only and normally services interrupts to this machine while it supports execution of the user's application program, be it an interactive or batch task.

The control program 2 controls all the resources both physical and logical, used in the computer processor and its peripheral devices that constitute the virtual machine system. There is a copy of the control program in the VM host system. The CP 2 provides specialized services for the virtual machines 3 including communication facilities by and between the various virtual machines. In the IBM system, this communication may occur in various ways, the two most common current ways being IUCV and VMCF (including SMSG) which is a particular subset of VMCF. In FIG. 1, the communication facilities VMCF are denoted as 4 and run within the system control program 2 and the CMS portion of each VM machine 3 to provide communication between the virtual machines and other virtual machines via communication program 2. The CMS conversational monitor system supports a user's application program in the virtual machine. The CMS portion is denoted by 5 in FIG. 1 and the application program schematically by 6. CMS 5 is a program facility that serves individual users in either an interactive or batch mode for facilitating processes to accomplish their program tasks. Each VM user perceives and, in effect, actually has a copy of the CMS programming dedicated to his own usage. Some view the CMS system as a specialized operating system dedicated to providing interactive screens and dialog and program services for individual users. As such, the CMS 5 executes within a given virtual machine 3 and forwards to the control program 2 requests for real computer resources such as memory, disk, storage, printers and other I/O devices and requests communication with other virtual machines via the VMCF facility, for example. In general, all resource requests and actions must be sequenced and managed and controlled by the common focal point of programmed intelligence represented by the system control program 2. CMS interfaces these services to the user's program and processes interrupts presented to the user's task which are directed to it via the control program 2. CMS will discard those interrupts that are unnecessary and in some cases will refer to interrupts to the user or to the application in accordance with instructions that the user or application have issued previously to CMS. Although a CMS user or application may not and generally does not recognize the hierarchy that exists within the machine architecture, in fact, that actions available to a given user or application task running in a virtual machine are subjected to processing both by the CMS of system 5 and the control program 2 and are constrained in their access to resources and use of the system capabilities by the control program 2 to use only those resources that have been determined to be validly available to a user's individual virtual machine 3.

Thus, in the context of the present invention, when communication is desired between the virtual machine running a user's application task, 6, and some other virtual machine, 3, such as the source of suspend and resume commands, it is the user's VM which runs the suspend and resume program, 7. The communication facility VMCF must be invoked and validly accorded to the VM machines which are to utilize it. This involves the coordination of the system control program 2 and each of the VM programs 3 which are to communicate. Schematically this is shown by having copies of the VMCF/SMSG communicating facility 4 installed in the Cp and invoked or accepted by each necessary VM 3.

Now for an illustrative example, we may consider a batch program such as the type normally involved in running a company's payroll or inventory processing program or those employed for large computationally intensive tasks such as regression analysis of equations, astro-space navigational problems and the like. Such batch jobs are normally run in the VM systems in which they are written during off hours so as not to interfere with or prevent access to users who would like to have interactive enjoyment of the data processing systems' resources. Such users have desired the presently described facility for suspending and resuming operation so that they may temporarily allocate resources that are engaged in the batch process for some other use such as interactive work without disconnecting from the batch work itself. This would have the effect of destroying all of the batch processing intermediate results reached up to the time that interruption occurred. It would be extremely cost ineffective for example to operate an expensive and large virtual machine computer data processing facility on a major computational task only to have it interrupted and lose all of the results of the task generated so far and necessitate restarting and rerunning the program from the beginning. This would be especially undesirable in the interactive applications that the users might wish to run concurrently with batch task processing since frequent interruptions of the batch task might occur with consequent loss of the match processing results. To avoid these occurrences, such users normally run the major batch tasks in off hours, nights, holidays and weekends to avoid interference from or with other interactive user's programs. Interruption of the batch task is not normally permitted except temporarily by the control program or the task itself, for example to await resources needed by the task becoming available. These batch tasks usually consume large amounts of the total computer resources, thus denying those resources to all other tasks. Yet, during portions of the day, it is the interactive users' task which need preference for these same resources. Contention for resources used by batch tasks impedes the interactive users, but in such cases it is the interactive work which should be given clear precedence. Therefore, the present invention provides a solution by permitting actual suspension of the batch task without destroying the intermediate results that it is achieved. This is done with an easy means of facilitating both the suspension and resumption of processing by utilizing basic mechanisms of these systems that have long been available but have not heretofore been applied to this task.

Figure 2B:
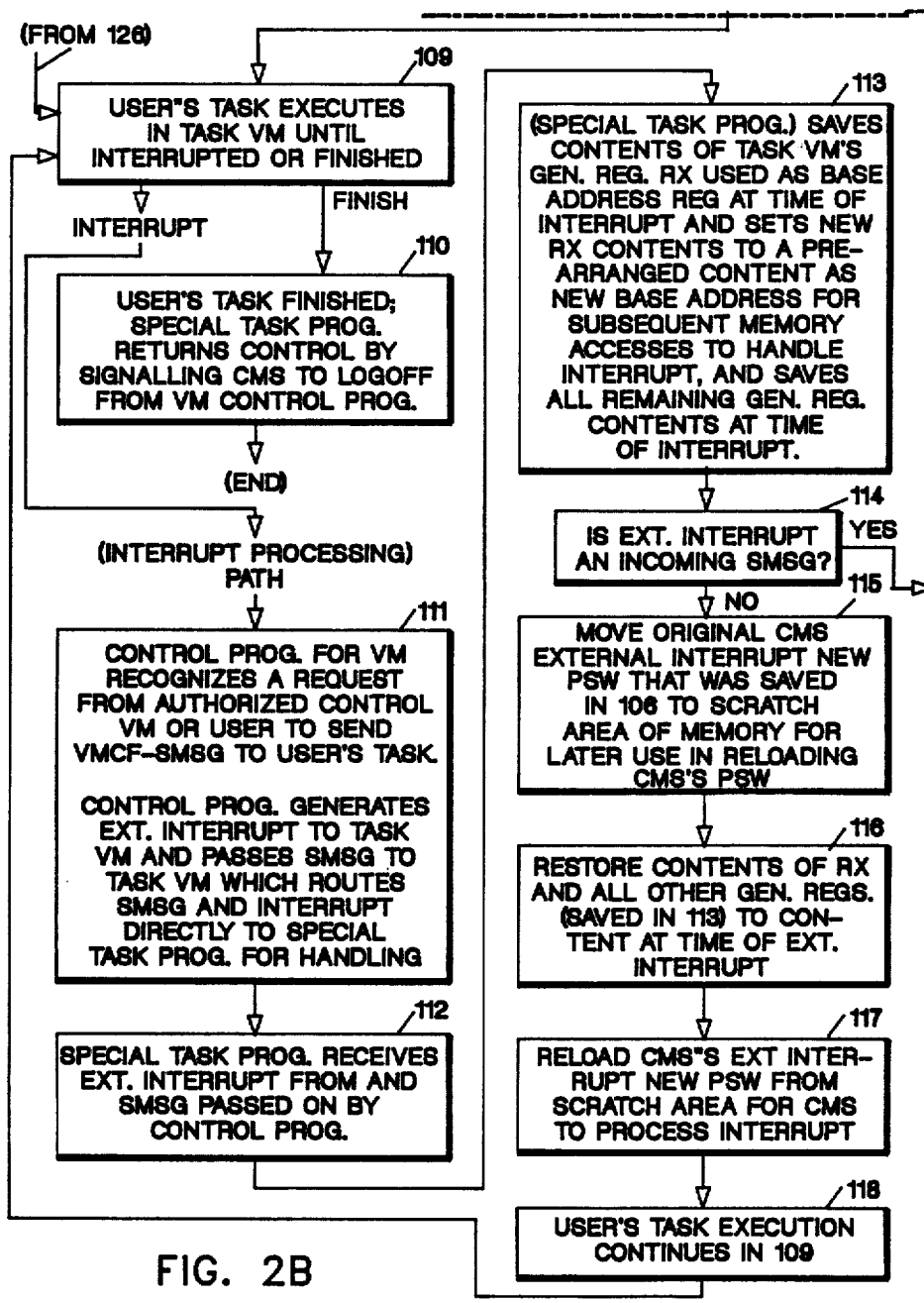
Figure 2C:
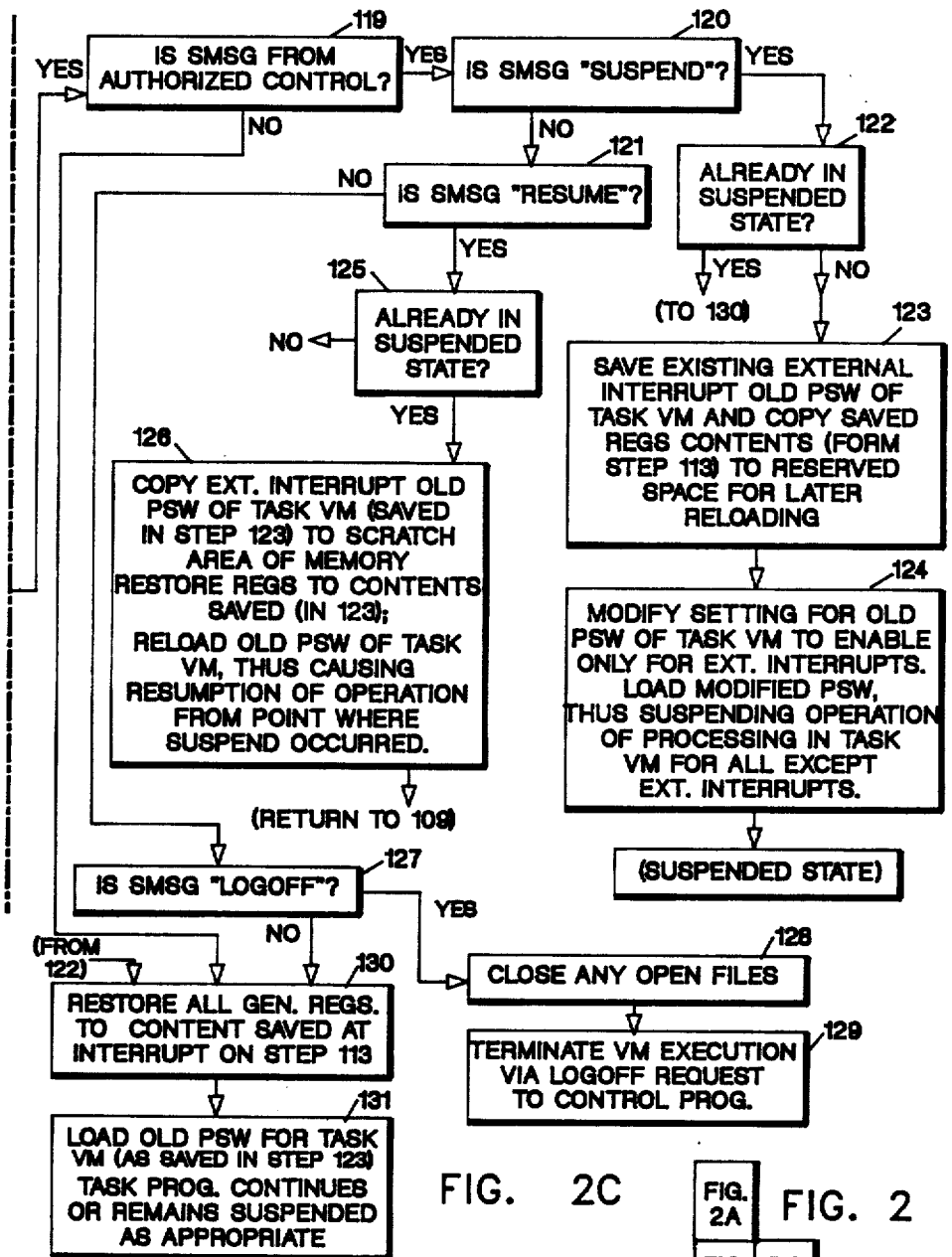
Figure 2:
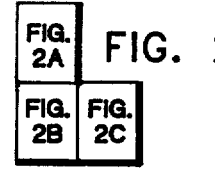
FIG. 2 comprising

The process of facilitating suspension and later resumption of processing in a virtual machine operating under control of a control program in a virtual machine data processing system of the IBM 370 type will now be described with reference to FIG. 2. FIG. 2 is a flow chart of the sequential steps in the method which must be carried out in oder to perform an effective suspension without destruction of the batch or task results in operation at the time the suspension order is received with a consequent later resumption from the point of interruption in the batch or task that is suspended.

Turning to FIG. 2, the description of the process begins with the steps involving installation of a special task program that handles the duties of providing a suspend and resume function for a user's task operating within a virtual machine 3 under control partially of the CMS system program 5 and of the control program 2 within a virtual machine data processing system of the IBM 370 type.

Beginning with block 100, the user's task virtual machine CMS program which controls the beginning of the user's task is set to invoke first the special small task program for handling suspension and resumption of the user's task. The special suspend and resume program is invoked before beginning the user's task.

In block 101, the special task program begins its own execution sequence. In block 102, the suspend/resume sub-program relocates itself to a reserved storage area in memory. This avoids potential conflicts for main storage, also known as "memory", between the user's task program which will be run in the same virtual machine later. In block 103 the special task program for suspension and resumption initializes the virtual machine control registers and enables it to support the VMCF/SMSG communications with an authorized control virtual machine or user that will issue the eventual suspend or resume commands to which the system should respond.

The next task which the suspend resume program undertakes is to temporarily disable all interrupts to the virtual machine in which it is running. In this block 104, the program must set the machine control register mask bits in the machine's PSW to disallow any interrupts. This is a preparatory step and is not to be confused with the suspension or resumption of the user's task which has not yet been invoked.

In block 105, the special suspend/resume task program modifies the virtual machine control registers to allow it to accept only external interrupts for the VMCF/SMSG type of communications. Block 103 noted earlier established for CMS and for the virtual machine the assignment of necessary addressing and control to permit communication between the virtual machine and the control program and via the control program to any other virtual machine utilizing the existing system's VMCF communication facility. In block 105, the virtual machine control registers are set to accept only external interrupts for this type of communication and, as will be noted in block 106 that follows, the special suspend resume program has a task of saving all the original CMS external interrupt control register and PSW settings that would normally permit the CMS portion of the program to handle or respond to interrupts and to manage other facilities for the user.

In block 107, the next task of the suspend resume program is to write a new external interrupt new PSW for CMS of the virtual machine in which it is running. The new PSW is used to route any incoming external interrupts to the special program itself for analysis and response. In block 107 the suspend resume program also re-enables interrupts to the task virtual machine that were earlier disabled in block 104. At this point, the virtual machine has been re-enabled to handle interrupts by routing them to the suspend resume sub-program running within the machine rather than allowing CMS to analyze and respond to them in the first instance. All the other capabilities of the CMS system are left intact and have been restored so that its normal function in facilitating and in servicing the user's task which will be run in this virtual machine are available for use.

In block 108, the suspend resume sub-program signals CMS of the task virtual machine in which it is running to begin the user's task processing. This is accomplished by passing the start-up parameters for the user's task to the task virtual machine via CMS and, as noted in block 109, the user's task begins to execute in the vritual machine while the suspend resume programs is essentially waiting and monitoring in an idle state unless and until an external interrupt is directed to it by CMS by virtue of the external interrupt new PSW that was rewritten in block 107 for CMS.

As shown in block 110, the user's task may normally finish without interruption and at this time the suspend resume program will return control over all further actions to CMS by signalling CMS to conduct a logoff from the virtual machine control program CP at the end of the user's task.

FIG. 2 continues, in block 111, with the sequence of events that occurs in the event that an external interrupt is received at CMS and routed to the suspend resume task running in the virtual machine.

In block 111, it is assumed that an incoming command to suspend or resume is recognized as a request from the authorized control or virtual machine or user as shown in FIG. 1. Such a request from the authorized control or user would be in the form of a request to send the VMCF/SMSG to a given user's task to cause it to be suspended or resumed. In response to this request, the control program 2 in FIG. 1 will generate the external interrupt to the task virtual machine and will pass the SMSG to the this virtual machine which will instantly route both the message and the interrupt signal directly to the suspend/resume task program as directed by its external interrupt new PSW which was reset in block 107 to perform this task.

In block 112, the suspend resume program receives the external interrupt routed to it by CMS and it receives the message that may contain the suspend or resume command passed to it by the control program.

In block 113, the suspend resume task program begins preparatory action by saving the contents of the task virtual machine's general register Rx which immediately will be used as a base address register, thereby allowing subsequent addressing of storage locations. It then loads Rx with a prearranged address value. Next, the program saves in storage all remaining general register values as they existed when the interrupt occurred.

In block 114, processing of the interrupt is continued by asking an analytical question as to whether the incoming interrupt pertains to an SMSG. If the incoming interrupt is not an SMSG, it logically cannot be either a suspend or resume command and the suspend/resume task program will not further be invoked to handle the interrupt. Instead, as shown in block 115, the suspend resume program will restore the original CMS external interrupt new PSW that was previously saved in block 106 by writing it into a scratch area of memory for later use when it reloads CMSs new PSW to permit CMS to handle the incoming interrupt.

In block 116, the suspend resume task program restores the contents of the general register Rx and all of the other general registers that were saved in block 113 to their contents that existed at the time the interrupt occurred, thus restoring the task machine's status to that which existed when it was interrupted. Next, in block 117, the suspend resume routine causes a reloading of CMS's external interrupt new PSW from the scratch area from which the PSW was written in block 115. This causes CMS to begin processing the interrupt since it has been determined that the interrupt is not of the SMSG type. As shown in block 118, execution of the user's task continues, the schematic equivalent of going back to block 109 and continuing operation.

As alluded to in the description earlier with regard to block 114, the incoming interrupt might be of the SMSG form and could therefor, if from an authorized control VM or user, contain a suspend or resume command. Consequently, in block 119, if an incoming interrupt is an SMSG, another question is asked by the suspend resume process to determine whether the SMSG is from an authorized source. If it is not, the program moves to block 130 where general register contents saved in block 113 are all restored and, in effect, the incoming interrupt is ignored since it is not from an authorized source, and processing of the task continues.

If, however, the result of the inquiry in block 119 is affirmative, analysis is made to determine whether the SMSG is a suspend command or resume command as shown in blocks 120 and 121. If the SMSG does contain a suspend command, block 122 is invoked to determine whether the system is already in a suspended state. If the system has already been suspended and this is a redundant command, the system moves to block 130 which restores registers, a step that is actually redundant if an actual suspension has occurred since no intermediate processing would have occurred, and moves to block 131 where it remains suspended as noted.

If, however, this program task execution has not been suspended already, block 123 is invoked which saves the existing external interrupt old PSW for the task VM and copies the saved register contents that were preserved in step 113 to a reserved space for later reloading. Next, in block 124, the critical step of modifying the settings for the program interrupt controls in the PSW of the task VM are carried out to enable the task VM to only handle external interrupts. This is accomplished by loading a modified PSW for the task VM, thus suspending operation of processing since no other operations or processes will be enabled in the task VM unless and until an external interrupt, the only action for which it is enabled, occurs.

Having reached the point where suspended state has been achieved, the task operating in the virtual machine is suspended and no further action occurs until an incoming interrupt is directed by the CP, using the modified CMS external old PSW, to the suspend resume task program where it is analyzed as in box 114 through box 121. In block 121, if the SMSG is a resume command, a check is made in block 125 to determine whether the suspended state is already in existence and if it is, block 126 sets forth the acts necessary to restore operation to the suspended task. These include copying of the external interrupt old PSW for the task virtual machine that was saved originally in step 123 during the suspension step into a scratch area of memory for later access and use. It also involves restoring registers of the virtual machine to their content that was originally saved in step 123 and a reloading of the old PSW for the task virtual machine from the scratch area of memory. This causes resumption of operation of the task program from the point where the suspension occurred. It is logically equivalent to returning to block 109 in the flow chart.

If the incoming SMSG analyzed in block 121 is not a resume command, a further question is asked, in block 127, as to whether it is a logoff. If logoff is the command, process continues in blocks 128 and 129 as shown to close any open data files and to terminate VM execution via a logoff request to the control program. This is the equivalent to finishing block 110 except that the user's task may not have, in fact, been finished when an authorized logoff command has been received.

This completes the description of the basic process carried out by the special small suspend/resume task program that is run in the virtual machine prior to and concurrently with execution of the user's task in that machine. It may be seen that the suspend/resume task program initializes itself and the virtual machine to cause it and not the CMS to have the first opportunity to analyze and respond to incoming external interrupts. For those interrupts which are of the SMSG form, the suspend/resume task program is invoked to save a "snapshot" of the virtual machine's operating status and condition at the time of the interrupt and to set the PSW for the virtual machine in such a fashion that further processing is halted. There, the system awaits further instruction in the form of a resume command or an authorized logoff command and takes the appropriate steps as a consequence of the receipt thereof as noted with respect to the discussion of FIG. 2. It may be observed that the facilities of the VM system, namely the program interrupt controls which constitute the PSWs have been manipulated in a unique way to provide, without interference with other system resources, an effective means of suspending and later resuming actual operation of a batch task or similar task running in a virtual machine. No new programming techniques are involved nor are any specialized commands or processes invoked. Instead, the normal communication and control paths are employed in a new way to permit the special alternate handling of incoming interrupts to a task virtual machine to be allocated to a task program rather than to a CMS system that normally services the task program at the first instance of the incoming interrupt. A variety of techniques for seizing control over the handling of incoming interrupts might be envisioned; thus, what is described in the appended claims is intended by way of description and not of limitation since it may occur to those of skill in the art to implement seizing of control over handling of interrupts in a variety of other ways than those specifically illustrated.

What is claimed is:

1. In a virtual machine data processing system having at least a control program operating in a computer having a memory and hardware and software program facilities constituting a plurality of virtual computing machines, and having at least a task virtual machine having program interrupt controls and operating to process a user's task program, a task program to be processed, and communication facilities between virtual machines and the control program, the improvement for creating a temporary suspension and later resumption of processing of said task program in said task virtual machine comprising steps of:

receiving at said control program a command originated from a user of said data processing system and a signal indicating the presence of a request for delivery of said command to said task virtual machine for suspension of processing of said task program;

communicating said command by said control program to said task program which is to be suspended through said task virtual machine;

detecting by said task program a suspend command in said communicated command and, thereafter, modifying the program interrupt controls of said task virtual machine by said task program to enable only responses to external interrupts originated outside said task program to occur for suspending further processing in said task virtual machine of said task program.

2. The method of claim 1 said modifying step, further including a step of:

modifying the program interrupt controls of said task virtual machine to direct incoming external interrupts to said task program for analysis and response.

3. The method of claim 1, further including a step of:

saving a record said task virtual machines' program interrupt control settings and of all of said machines' general register contents that exist at the time said task program receives said suspend command.

4. The method of claim 2, further including a step of:

saving a record said task virtual machine's program interrupt control settings and of all of said machine's general register contents that exist at the time said task program receives said suspend command.

5. The method of claim 1 or claim 2, further including steps of:

detecting by said task program a resume command in said communicated command, and modifying the program interrupt controls of said task virtual machine by said task program to re-enable all interrupts for resuming processing in said task virtual machine of said task program.

6. The method of claim 3 or claim 4, further including steps of:

detecting by said task program a resume command in said communicated command, and;

modifying the program interrupt controls of said task virtual machine by said task program to re-enable all interrupts for resuming processing in said task virtual machine of said task program.

7. The method of claim 6, further comprising a step of:

restoring all of said task virtual machine's general register contents to their content existing at the time said task program received said suspend command.

* * * * *